United States Patent [19]

Cardone et al.

[11] 4,356,467

[45] Oct. 26, 1982

[54] MAGNETIC WORK-HOLDING DEVICE

[75] Inventors: Michele Cardone; Angelo Grandini; Bruno Zaramella, all of Milan, Italy

[73] Assignee: Magento Tecnica di Cardone Michele & C.S.n.c., Milan, Italy

[21] Appl. No.: 82,212

[22] Filed: Oct. 4, 1979

[30] Foreign Application Priority Data

Oct. 6, 1978 [IT] Italy .............................. 28502 A/78

[51] Int. Cl.³ ............................................. H01F 7/20
[52] U.S. Cl. ..................................... 335/295; 335/289
[58] Field of Search .......................... 335/285–295

[56] References Cited

U.S. PATENT DOCUMENTS

| | | | |
|---|---|---|---|
| 3,316,514 | 4/1967 | Radus et al. | 335/291 |
| 3,477,050 | 11/1969 | Hinger | 335/295 |
| 4,090,162 | 5/1978 | Cardone et al. | 335/289 |

*Primary Examiner*—Harold Broome
*Attorney, Agent, or Firm*—Abelman, Frayne & Rezac

[57] ABSTRACT

A magnetic work-holding device with at least two pole shoes defining a work surface, and a main magnetic core interposed between the two aforementioned shoes; the other sides of the pole shoes are fed by secondary magnetic elements whose poles facing the same pole shoe, have the same sign as the pole corresponding to the main magnetic core. A ferromagnetic yoke encircles the base and the sides of the equipment, short-circuiting the remaining poles of the secondary magnetic elements.

8 Claims, 4 Drawing Figures

MAGNETIC WORK-HOLDING DEVICE

BACKGROUND OF INVENTION

This invention relates to a magnetic work-holding device for the anchoring of small-sized or large ferrous pieces, which may be employed both as a magnetic anchoring chuck for machine tools, and in order to lift units by means of suitable lifting and conveying equipment.

Generally known magnetic work-holding device are characterized by the fact that the magnetic circuit is designed in such a way as to prevent several leakage paths of the magnetic flux with a consequent substantial reduction in the force of anchorage of any unit; this is due, in particular, to the fact that in such known device one employs the external part of the ferrous yoke as a unipolar flux conductor as well as a component of the work area, namely as a part of the magnetic surface for the anchorage of the pieces. In the presence of relatively low field forces, soft iron exhibits a considerable concentrating capacity of the magnetic flux, if compared to that of any existing permanent magnet or of a free solenoid. Given the geometric ratio existing between magnetic flux density and mechanical "force" $F=B2\times 4/100$ (B induction), it becomes clear that it is necessary to produce magnetic circuits in which the induction of the magnetic core(s) is conveyed and concentrated onto the work point by suitable "soft" ferromagnetic conductors (low carbon content and nonalloy steel).

The conductors, in their assembly, define the ferrous yoke of the magnetic circuit; the ferrous yoke, however, on the one hand is indispensable in order to achieve a certain concentration of "force" in the working area, on the other hand, it tends to disperse a certain quantity of the magnetic flux along undesired paths. The calculation of the dispersed fluxes is extremely complex and uncertain; builders of magnetic equipment of the above-mentioned type, therefore introduce a correction factor "K" into their calculations, with a degrading of the equipment which, in practice, varies between 30% and 70% of the magnetic induction theoretically available in the working area.

SUMMARY OF INVENTION

This invention relates to a magnetic work-holding device, of the kind specified above, the magnetic circuit of which has been designed in such a way as to considerably reduce the dispersed flux, thus increasing the force of anchorage; this is due to a special type of magnetic circuit which ensures optimum conveyance and concentration of the flux supplied by a given quantity of magnet in the working area.

In general, in accordance with the invention, a magnetic work-holding device has been supplied, in which the pole shoes are fed by magnetic cores and define a working surface for a ferromagnetic unit to be anchored, and is characterized by the fact that it comprises at least two pole shoes made of ferromagnetic material defining the above working surface, which are fed by a main magnetic core whose poles have opposite signs are interposed between the aforementioned pole shoes, and respectively by secondary magnetic elements having poles facing a respective pole shoe, and the same sign as the corresponding pole of the main core, with the addition, of an external ferromagnetic yoke which short-circuits the remaining poles of one sign, of the secondary elements of one pole shoe, and the remaining poles having the opposite sign of the secondary elements of the other pole shoe.

DESCRIPTION OF THE DRAWINGS

The invention will be illustrated in greater detail hereunder with reference to the examples of the enclosed drawings, in which.

DESCRIPTION OF THE INVENTION

Figure 1:
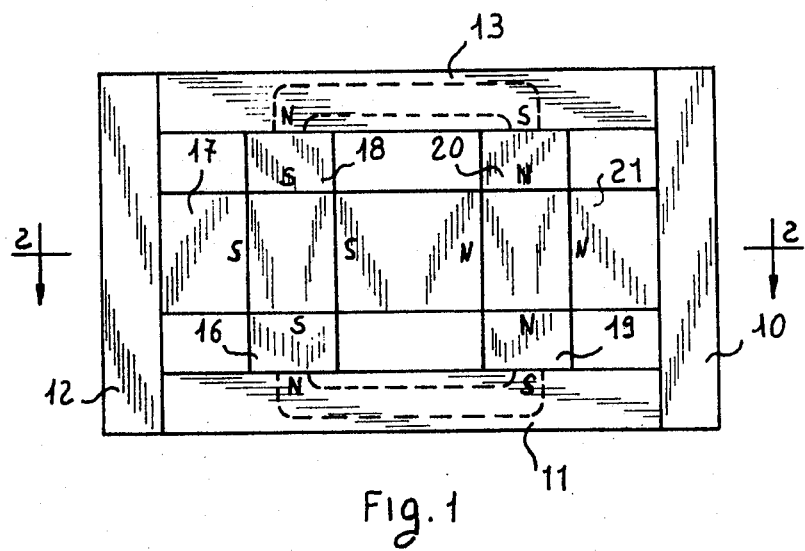
FIG. 1 is a plan view of a simplified embodiment of the equipment.

Limiting our examination, for the time being, to FIGS. 1 and 2, we shall describe the invention as a general solution, it being understood, nevertheless, that alterations and variations may be introduced to the invention itself, on the basis of what will be said hereunder; in particular, for the sake of simplicity, in the following we shall refer to "magnetic cores" including in such expression both the adoption of electromagnetic cores and that of permanent magnetic cores.

In its most general form the equipment is formed of at least a first pole shoe 1, made of ferromagnetic material and at least a second pole shoe 2, made of ferromagnetic material, placed laterally and parallel with in respect of the previous one; the two pole shoes 1 and 2 which in the example under discussion are parallelepipedon in shape, define—with their top faces 3 and 4 respectively—a working area or surface to which a generic piece 5 in ferrous material may be anchored.

A main magnetic element 6 is interposed between the two pole shoes 1 and 2, its polarization axis pointing toward the above pole shoes, in such a way that one pole, e.g. its S pole, is either in contact or pointing toward a side surface of one of the pole shoes, in the case under discussion shoe 1, while the other N pole is in contact or pointing toward the respective lateral surface of the other pole shoe 2.

Besides the main feeding magnet 6 interposed between pole shoes 1 and 2, the equipment comprises, for each pole shoe, some further secondary magnetic elements on the whole marked by 7, the magnetization axis of each of which is pointing toward a corresponding lateral surface of the aforementioned pole shoe; in particular, the arrangement of the secondary magnetic elements 7 must be such that, the working surface of the equipment being set in action, the poles of the secondary magnetic elements facing or in direct contact with one of the pole shoes 1, 2 all bear the same sign as the corresponding pole of the main magnetic core 6; hence, the equipment in its working state has the two poles shoes assuming polarities of mutually opposed signs.

Furthermore, the equipment comprises an external ferromagnetic yoke, in its entirety marked by 8, which, as indicated, short-circuits the remaining poles of secondary magnetic elements 7 bearing one sign, namely the opposite poles in respect of those facing the aforementioned pole shoe, with the remaining poles, bearing the opposite sign in respect of the previous ones, of the secondary magnetic elements 7 of the other pole shoe.

Figure 2:
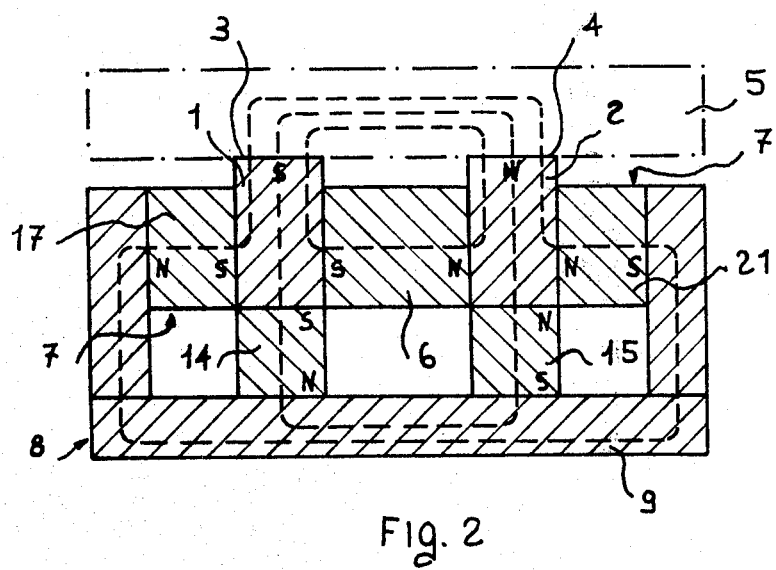
FIG. 2 is a cross-sectional view, according to line 2—2 of FIG. 1, of the equipment in its operative state.

In particular, the equipment according to the example shown in FIGS. 1 and 2 comprises a ferromagnetic yoke 8 made up of a base 9 and of peripheral walls 10, 11, 12 and 13 arranged perpendicularly in respect of base 9, to which they are fastened e.g. by means of suitable bolts (not shown). The two pole shoes 1 and 2 are placed at right angles in respect of base 9, inside the peripheral walls, the main magnetic element 6 being interposed inbetween the above shoes. As shown in FIG. 1, a first secondary magnet 14 and 15 respectively is set between base 9 of the ferromagnetic yoke and each pole shoe 1,2 the magnetization axis of each magnet being parallel or coinciding with the axis of the pole shoe itself. Some further secondary magnets 16, 17, 18 for shoe 1 and, respectively, 19, 20, 21 for shoe 2, are arranged between the lateral surface of shoes 1 and 2 and the corresponding inside surfaces of the peripheral walls 10, 11, 12, 13 of the abovementioned ferromagnetic yoke.

Considering the special arrangement of the secondary magnetic 16, 17, 18, 19, 20 and 21, the magnetic axis of each of which is parallel to base 9, and since the secondary magnetic components of each pole shoe present their homonymous poles in contact with the latter which bears the opposite sign of the homonymous poles of the secondary magnets corresponding to the other pole shoe 2, it follows that the secondary magnetic components of one pole shoe will be in series with the magnetic cores of the other pole shoe, because the peripheral walls of the ferromagnetic yoke will act as a connecting bridge between the above magnetic cores. The same applies to secondary magnets 14 and 15, which will be in series by way of base 9. Therefore, assuming that the magnetic induction of the secondary magnets 14, 16, 17 and 18 is equal to the magnetic induction supplied by secondary magnets 15, 19, 20 and 21 and that the section of the magnetic yoke is sufficient to convey the magnetic flux produced, the result will be an external ferromagnetic yoke 8 perfectly neutral in any point of its surface since its polarization bears the sign "N" and is balanced by an "S" polarization, which is equal and contrary to the former.

Hence, although in the example shown in FIG. 1 pole shoes 1 and 2 are depicted as protruding in respect of the ferromagnetic yoke, in fact the lateral walls of the latter might even be extended so as to reach the same level as the anchoring surface defined by the aforementioned shoes, since they are neutral.

The end result of such structure of the magnetic circuit of the described equipment, amounts to a forced conveyance of the flux and a high concentration of the magnetic induction supplied by all the cores in the working area of the anchoring surface; on the basis of tests carried out, it has been seen that under such conditions, the correction factor "K" relative to the ratio between theoretic induction and employable induction, does not exceed an incidence of 15% as opposed to a correction factor which in known equipment may reach even 70%. Consequently, given the same quantity and quality of magnetic material employed, the magnetic equipment according to this invention develops a mechanical force of anchorage of piece 5 that is at least 50% above that which may be achieved by means of any previously known magnetic circuit.

The relative increment in mechanical force increases with the increasing of reluctance to the closing of the magnetic field between the working surface and the piece to be anchored (less than perfect contact due to deformation, impurities, non magnetic protective layers, etc.)

In fact, in traditional magnetic circuits the increase in such reluctance, as a consequence of the increase in the air gap, entails a proportional increase in the size of the leakage of flux density, according to the law of the easiest path. The consequence is a loss of force of an exponential kind.

On the other hand, with the magnetic circuit described herein, the increase of the air gap as well as the reluctance in the working surface will produce a linear decrease of the force for the almost total absence of leakage paths.

In fact, pole shoes 1 and 2 are the only "soft" ferromagnetic parts of the circuit that are fed by unipolar magnetic sources. Since they are provided on all non-working sides with magnetically active material, they do not offer considerable leakage paths.

The ferromagnetic yoke 8, as well, does not present any magnetic leakage path, since it is fed by equal and opposite magnetic forces (bipolarized). Once again, following the law of the easiest path, the correct balancing of the two feeding forces N and S of the yoke excludes any possibility of leakage.

Figure 4:
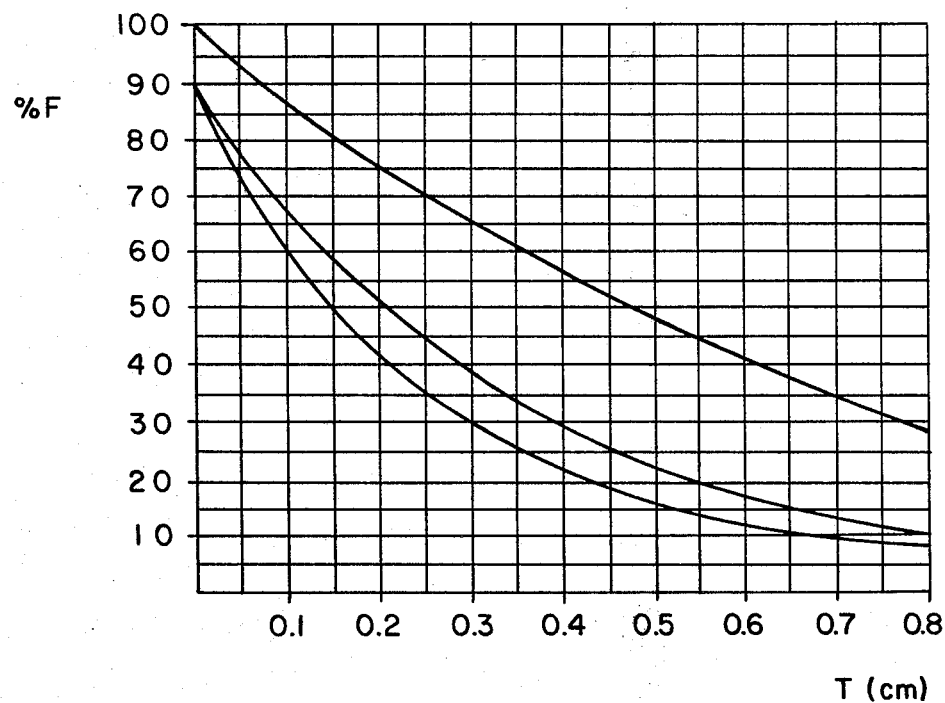
FIG. 4 shows a comparative diagram relative to the drop in mechanical force, in the presence of a variable air gap.

FIG. 4 illustrates the development of the drop in mechanical anchorage force F (expressed as a percentage), in the presence of a variable air gap T (expressed in cms.). In particular, curve A which exhibits a substantially rectilinear trend relates to the magnetic circuit according to this invention, while curve B relates to a known magnetic circuit made up of a magnet enclosed by two lateral pole shoes, and curve C relates to a known magnetic circuit comprising three pole shoes the two far ones being connected by a base ring. The curves were noted experimentally, by means of sample equipments, in which magnetic cores with constant magnetic dimensions and features are employed as well as ferrous yokes obtained from material having constant and homogenous characteristics. In particular, curve A exhibits a smaller specific drop of the force with variations in the air gap, a feature which makes it possible—with the same quantity of magnetic material employed as B and C—to obtain a working force that is higher by 50-70% for air gap values of 0.2-0.5 cm.

So far the anchorage surface of the equipment has been considered to be permanently activated; therefore, it will be necessary to use permanent magnetic cores made of any material suitable for the purpose that particular equipment has been designed for; it is obvious that in this case, the detachment of piece 5 will be possible only by overcoming the force which keeps the unit itself anchored to the equipment.

Where the units to be anchored are of considerable weight, and hence require high anchorage forces or in the case of special applications require the deactivation of the equipment before detaching piece 5, it is possible to employ electromagnetic cores instead of the permanent magnetic cores mentioned previously.

Figure 3:
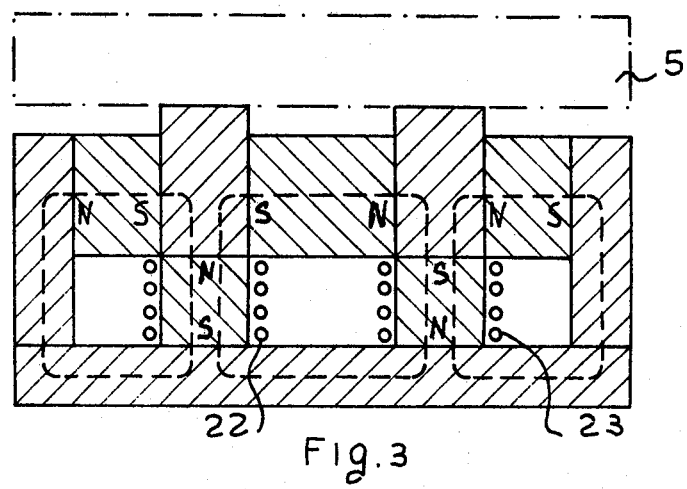
FIG. 3 is a sectional view, similar to that of the previous figure, of a further embodiment, the equipment being in its non-operative state.

Another solution is shown in FIG. 3 which constitutes a section similar to that of FIG. 1. Also in the case of FIG. 3 the main magnetic elements 6 and the secondary magnetic cores marked on the whole by 7 are constituted by permanent magnets; the activation and deactivation of the magnetic anchorage surface may occur, for instance, by inverting the polarity of the main magnetic elements 6 or of some secondary cores 7. The inversion of polarity of the pole components may take place in any suitable way, e.g. through a simple 180° rotation of the core or of the aforementioned magnetic cores, around an axis at right angles with respect to of the magnetization axis of the magnet itself.

Another possible solution requires the adoption of invertible magnetic cores, namely permanent magnetic cores the polarization direction of which can be inverted without damaging the remaining non-invertible magnets, operating by means of an electromagnetic field of suitable intensity and with an opposite direction in respect of the magnet which is to be inverted. The electromagnetic field may be generated, for instance, by a winding around the magnetic core bound to be inverted, as marked by 22 and 23 for the secondary magnetic cores 14 and 15, FIG. 3, and which is fed in a direction with a given current pulse capable of bringing about a semi-hysteresis, e.g. for the deactivation of the magnetic equipment, while it is fed by a current pulse in the opposite direction of the previous one for the activation or reactivation of the above equipment.

The activated and deactivated states of such equipment are indicated by the trend of the dotted flux lines in FIG. 2 and FIG. 3 respectively. In the activated state shown in FIG. 2 it is possible to see that the path of the flux lines close through pole shoes 1, 2 and piece 5 to be anchored. On the other hand, in the desactivated state shown in FIG. 3 the flux lines close along internal paths which pertain only to the ferromagnetic yoke 8. It is obvious, that the internal paths of the flux for the desactivation of the equipment will be susceptible to variations in respect of the figures shown, according to the position and the choice of the invertible cores.

From the foregoing and drawings it should be clear that what has been provided is a magnetic anchoring equipment of the kind specified above where the magnetic base circuit is characterized by a magnetic anchoring surface defined by two pole shoes in ferromagnetic material, each of which is fed by magnetic cores which, when the equipment is activated, present their poles facing the shoe itself which all have the same sign, but have the opposite sign in respect of the poles of the cores operating on the other pole shoe. In any case, it is important that the value of the magnetic induction of each core operating on one pole shoe be equal to the value of the induction produced by the corresponding core operating on the other pole shoe.

Starting from a rectangular structure of the magnetic circuit such as that shown in FIG. 1, it is possible to obtain large anchorage surfaces simply by multiplying or increasing the number of base circuits. Furthermore, it is specified that the magnetic induction of the invertible core operating on a pole shoe is equal to the sum of the magnetic induction produced by all the other cores operating on the same pole shoe.

We claim:

1. A magnetic work-holding device comprising: pole pieces fed by magnets and defining a work-holding surface for one or more work-pieces, there being at least two pole pieces fed by a main permanent magnet means disposed therebetween, at least two corresponding sides of each of said pole pieces cooperating with a secondary permanent magnet means, the secondary magnet means being magnetized in a direction to present to the pole of the same sign as the cooperating pole of the main magnet means, and an external ferromagnetic yoke short-circuiting the remaining poles of the secondary magnet means, at least one of said magnet means being invertible in magnetic field to activate or deactivate said work-holding surface.

2. A magnetic work-holding device, according to claim 1, wherein: the pole pieces extend beyond the ferromagnetic yoke.

3. A magnetic work-holding device, according to claim 1, wherein: the ferromagnetic yoke presents magnetically neutral side walls extending up to the level of said work-holding surface.

4. A magnetic work-holding device, according to claim 1, wherein: said main and secondary magnets are permanent magnets.

5. A magnetic work-holding device, according to claim 1, further including means rotatably mounting said main permanent magnet means to effect magnetic field inversion thereof, said magnetic field being inverted by rotation of said main magnet means to activate or deactivate said work-holding surface.

6. A magnetic work-holding device, according to claim 1, further including an electric winding encircling at least one of said permanent magnet means and which is fed with a pulse current capable of generating an electromagnetic field, said electromagnetic field acting to reverse the magnetic field of said permanent magnet means to activate and deactivate said work-holding surface.

7. A magnetic work-holding device according to claim 6, wherein said magnetic induction of said magnet means encircled by electric windings is equal to the sum of the magnetic induction produced by all the remaining means acting on the same pole piece.

8. A magnetic work-holding device comprising at least two pole pieces each having one side defining a work-holding surface for one or more work-pieces, a main permanent magnet disposed between said pole pieces, reversible permanent magnet means encircled by electric windings each disposed with one pole in contact with the opposite side of said two pole pieces, and secondary magnet means in contact with at least one lateral side of each pole piece, said main and secondary magnets being magnetized in a direction to present to each said pole piece a pole of the same sign, and an external ferromagnetic yoke short-circuiting the remaining poles of said reversible and secondary magnets.

* * * * *